(12) United States Patent
Hernandez

(10) Patent No.: US 7,515,252 B2
(45) Date of Patent: Apr. 7, 2009

(54) OPTICAL FINGERPRINT IMAGING SYSTEM AND METHOD WITH PROTECTIVE FILM

(75) Inventor: Sergio Hernandez, Oceanside, CA (US)

(73) Assignee: Cardinal Health 303, Inc., San Diego, CA (US)

( * ) Notice: Subject to any disclaimer, the term of this patent is extended or adjusted under 35 U.S.C. 154(b) by 244 days.

(21) Appl. No.: 11/325,784

(22) Filed: Dec. 30, 2005

(65) Prior Publication Data

US 2007/0153258 A1 Jul. 5, 2007

(51) Int. Cl.
*G06K 9/74* (2006.01)

(52) U.S. Cl. .............................. 356/71; 382/124; 427/1; 427/152

(58) Field of Classification Search ................... 356/71; 382/124; 427/1, 145, 152
See application file for complete search history.

(56) References Cited

U.S. PATENT DOCUMENTS

| | | | |
|---|---|---|---|
| 4,544,267 A | | 10/1985 | Schiller |
| 4,699,077 A | * | 10/1987 | Meadows et al. ........... 118/31.5 |
| 4,706,600 A | * | 11/1987 | Mason et al. .............. 118/31.5 |
| 4,943,089 A | * | 7/1990 | Reardon ...................... 283/81 |
| 5,013,071 A | * | 5/1991 | Tremaine ..................... 283/69 |
| 5,114,188 A | * | 5/1992 | Koch ........................... 283/68 |
| 5,635,723 A | * | 6/1997 | Fujieda et al. ............... 250/556 |
| 6,122,394 A | * | 9/2000 | Neukermans et al. ........ 382/124 |
| 6,162,485 A | * | 12/2000 | Chang ............................ 427/1 |
| 6,665,427 B1 | * | 12/2003 | Keagy et al. ................ 382/124 |
| 2001/0025532 A1 | * | 10/2001 | Kramer ................... 73/862.68 |
| 2002/0053857 A1 | | 5/2002 | Scott et al. |
| 2002/0083329 A1 | * | 6/2002 | Kiyomoto .................... 713/186 |
| 2003/0097853 A1 | * | 5/2003 | Adaniya et al. ............... 62/244 |
| 2003/0197853 A1 | | 10/2003 | Fenrich |
| 2004/0060989 A1 | | 4/2004 | Bove |
| 2005/0089204 A1 | * | 4/2005 | Carver et al. ................ 382/127 |

FOREIGN PATENT DOCUMENTS

| | | |
|---|---|---|
| EP | 0045915 A1 | 2/1982 |
| EP | 1316913 A2 | 11/2002 |
| EP | 0867829 A2 | 8/2007 |
| GB | 2219870 A | 12/1989 |
| WO | 0110296 A2 | 2/2001 |

OTHER PUBLICATIONS

International Search Report, PCT/US2006/047253, International Filing Date, Dec. 12, 2006, Applicant: Cardinal Health 301, Inc. PCT/US2006/047253; Written Opinion of the International Searching Authority.

* cited by examiner

*Primary Examiner*—Roy M Punnoose
(74) *Attorney, Agent, or Firm*—McDermott Will & Emery

(57) ABSTRACT

An optical fingerprint imaging system comprises an optically transparent platen and a protective film removably attached to the platen with an adhesive. The protective film protects the platen from scratches, pits, and other surface damage and is substantially chemically inert to petroleum-based substances which may come into contact when receiving a finger pressed to take a fingerprint image. The adhesive has a selected cohesive strength that allows the protective film and adhesive to be removed from the platen without leaving behind an adhesive residue. The protective film can be replaced periodically as part of maintenance of the platen to allow continued acquisition of accurate fingerprint images. A method for protecting a platen is also disclosed.

35 Claims, 5 Drawing Sheets

OPTICAL FINGERPRINT IMAGING SYSTEM AND METHOD WITH PROTECTIVE FILM

BACKGROUND

The invention relates generally to electronic acquisition of fingerprints and, more particularly, to a system and a method of protecting a platen of an optical fingerprint imaging device.

Electronic fingerprint acquisition systems have been introduced in recent times to eliminate the need for ink or a chemical reagent. In such systems, the subject's finger tip is pressed against or rolled over a planar or curved transparent platen in an optical system. Light is directed through the platen and is reflected from the finger tip into an optical path including mirrors or prisms, a lens, and an electronic image sensor such as a CCD imager of the type employed in video cameras. The image of the fingerprint may be digitized, analyzed, printed out, stored, transmitted, or compared with an existing fingerprint or fingerprints.

Fingerprint identification is an exacting science that requires the comparison of the many minute and unique characteristics of each fingerprint, including the pattern of ridge endings and ridge bifurcations and locations and directions of these features, known in the art as minutiae, of each person's fingerprint. The total collection of minutiae should be complete enough to collectively comprise a signature or template uniquely identifying the owner of the fingerprint. Comparisons between the template of an unknown fingerprint and templates of fingerprints of known persons may be accomplished manually or by an electronic system. The process of matching fingerprint templates to identify an unknown fingerprint requires the correlation of a minimum number of minutiae for accuracy. Regardless of the image capture method and regardless of whether the fingerprints are interpreted by a trained expert or by a machine, the clarity and resolution of an acquired fingerprint image is obviously of paramount importance. Without enough clarity, enough minutiae may not be obtained to make a clear match, if a match can be made at all.

In optical imaging devices, a finger tip is placed on a platen and a fingerprint image of that finger tip is derived from the selective reflection of light from the platen. Reflected light representative of fingerprint minutiae is converted into data by the imaging sensor, and that data is assembled by the imaging device into a fingerprint image. If assembled successfully, the fingerprint image has been "acquired." However, if a fingerprint image of low clarity and resolution is produced because of a cloudy, distorted, scratched, or imperfect platen, the number of minutiae regarding that fingerprint may be so limited that correlation of that minutiae with a database of fingerprint images may result in no correlation with another fingerprint or may result in a correlation with a large number of fingerprints thus making it impossible to identify this unknown fingerprint.

Unclear fingerprint images in electronic acquisition systems may be caused by (1) lack of contrast between the ridges and valleys, (2) interference caused by latent fingerprints on the platen, (3) dirt on the platen resulting from use or environmental conditions, (4) scratches or other defects to the platen resulting from use, vandalism, or environmental conditions, (5) excessive pressure between the finger tip and the platen, (6) poor contact between the finger tip and platen resulting in a poor reflected image, (7) distortion caused by rolling the finger over the platen, (8) poor resolution of the optical equipment, and (9) gross distortion resulting from system configuration. Other conditions may also result in an unclear image. Whatever the cause, an unclear fingerprint cannot be as accurately read or compared with an existing fingerprint for verification or identification purposes.

A large variety of electronic fingerprint imaging devices have been proposed in the art for improving the fingerprint capturing process. What many prior fingerprint imaging devices have in common is a relatively costly platen that is integrated into the device. As shown in FIGS. 1 and 2, the platen 20 of some prior fingerprint imaging devices 21 have an optically transparent or clear rigid first layer 24 covered by a second layer 26 made of a tacky polymer for improving the quality of a fingerprint image. In this case, the first layer is raised slightly above the housing 28 of the imaging device, and the first layer forms a raised wall around its periphery to form a pocket 30 that receives the second layer. The second layer may also be adapted to improve optical contact with a dry finger tip.

As shown in FIG. 3, a fingerprint image of a finger tip 32 is produced when some incident light 34 from a light source (not shown) passes through the first and second layers 24 and 26 and is reflected at portions of the second layer beneath valleys 36 on the finger tip due to a difference in refractive index between the second layer and air above the second layer. The reflected light 38 associated with the valleys of the finger tip is received by an electronic image sensor (not shown). Incident light is generally absorbed at portions of the second layer in contact with ridges of the finger tip. However, some of the incident light may also be reflected at portions of the second layer in contact with ridges of the finger tip, which results in reduced fingerprint image contrast.

To improve the image contrast, the second layer 26 of the platen 20 may also be designed to deform under pressure from the ridges 40 of the finger tip 32 pressed against it. The ridges and corresponding deformations are exaggerated for purposes of illustration. The deformations under the ridges cause the incident light 42 that is reflected beneath the finger tip ridges to disperse, which desirably reduces the amount of reflected light 44 associated with the ridges from entering the electronic image sensor, thereby making it easier for the imaging device to distinguish between ridges and valleys. Although not intending to be bound by theory, the above discussion and referenced drawings are provided for purposes of illustration only.

The large variety of electronic fingerprint imaging devices all have a common problem—platen maintenance. It is a completely natural and unavoidable occurrence that oils and dirt accumulate on the platen 20 during its use. Environmental conditions such as blowing dust and ultraviolet light can also contribute to a build-up of dirt, grease, or damage on the surface of the platen that obscures fingerprint images. Attempts to clean a dirty platen with a tissue may permanently abrade the surface of the platen and further obscure fingerprint images.

The platen 20 may degrade more rapidly in certain environments. Healthcare facilities often employ fingerprint imaging devices on medication dispensing cabinets, storage cabinets, and other equipment. Unfortunately, many platens are degraded by antibacterial and petroleum-based moisturizing lotions that are used on the hands of healthcare personnel and by antiseptic cleaning agents used on equipment. The tacky polymer second layer 26 of some platens has been found to chemically break down from such hand lotions and cleaning agents used in healthcare facilities. Chemical breakdown of the second layer 26 makes the second layer less resistant to scratching and pitting thus becoming more abraded with normal use.

When there are scratches, pits, or other defects 46 on an exterior surface 48 of the platen 20, as shown in FIG. 4, the incident light 34 that is reflected beneath the finger tip valleys 36 (FIG. 3) is dispersed and will not provide as clear an image. As such, defects on the surface of the platen undesirably reduce the amount of reflected light 38 associated with the valleys entering the electronic image sensor, making it difficult or impossible for the imaging device to accurately make out minutiae on the fingerprint. When this occurs with some imaging devices, the entire device 21 including the light source, prism, and sensor must be replaced. Other imaging devices allow for the platen alone to be replaced periodically. In either case, such replacements are costly and time consuming and may require special training and tools.

In addition to the inconvenience and cost of replacement, scratches, pits, or other defects 46 on the surface of the platen 20 can have a detrimental impact on workflow. For instance, healthcare professionals often must identify themselves when accessing electronically controlled medication dispensing cabinets, such as the Pyxis MedStation from Cardinal Health (San Diego, Calif.), which are used to store medications and supplies at nursing stations and other convenient locations within a healthcare facility. Fingerprint imaging devices are employed to automate the identification process and to increase security, especially when narcotics and other controlled items are stored in a medication cabinet. A platen 20 that has become cloudy as a result of chemical breakdown and micro abrasions (scratches) on its exterior surface and has become unusable or only intermittently usable to match fingerprints can disable the automatic log in and security features of the medication cabinet, thereby reducing the workflow efficiency in delivering patient care. As used herein, "controlled items" are not limited to narcotics but is a term meant to encompass any item that a healthcare facility desires to control or track.

Hence those skilled in the art have recognized a need for an improved optical fingerprint imaging system and method including a protective device that allows for quick, simple, and less expensive platen maintenance and reduces the need for such maintenance. The present invention satisfies this and other needs.

SUMMARY OF THE INVENTION

Briefly and in general terms, the present invention is directed to a system and a method for an imaging system, protective film, and method for protecting a platen from degradation. In accordance with certain aspects of the invention, there is provided an optical fingerprint imaging system for acquiring fingerprint images, the imaging system comprising an optically transparent platen having an exterior surface through which a fingerprint image is to be acquired, a protective film comprising a material that is substantially free from imperfections that would affect transmission of light in acquiring a fingerprint image and which is substantially chemically inert to petroleum-based substances with which it may come into contact when receiving a finger to acquire a fingerprint image, the protective film having an outer surface and an inner surface, the inner surface facing the platen, the film adapted to resiliently deform to ridges of a fingerprint from a finger pressed onto the film, and an adhesive disposed on the inner surface of the protective film for removably attaching the protective film in optical alignment with the platen, the adhesive having a selected cohesive strength such that the protective film may be removed without leaving an adhesive residue thereby allowing repeated replacement of the protective film.

In a more detailed aspect, the protective film comprises urethane. In another more detailed aspect, the urethane comprises the characteristics of an optical plastic in that it is free from imperfections which would affect its transmission of light.

In other aspects in accordance with the invention, the optically transparent platen comprises a rigid material and the protective film is mounted directly to the exterior surface of the platen. The protective film in this case comprises a thickness of greater than twenty-five mils. However in another aspect, the protective film comprises a thickness of about three mils to about six mils.

In yet further aspects, the protective film is adapted to deform around and contact finger tip ridges while maintaining a gap between finger tip valleys adjacent the finger tip ridges. Additionally, the adhesive further comprises a selected wet out characteristic thereby adapting the adhesive to fill in scratches, pits, and other surface irregularities disposed on a surface to which the protective film is mounted thereby increasing the transmission of light through the surface to which the protective film is mounted. The adhesive has a peel adhesion to the protective film that is greater than a peel adhesion to a surface to which the protective film is mounted. In one very detailed aspect, the adhesive comprises an acrylic polymer. The adhesive forms a coating having a thickness of about two mils or less on the protective film in another detailed aspect.

In further more detailed aspects, the platen comprises a first layer of material that is rigid and optically clear and a second layer of material forming the exterior surface of the platen through which light is transmitted to acquire a fingerprint image, the second layer of material is adapted to resiliently deform to ridges of a fingerprint from a finger, and wherein the protective film is mounted to an outer surface of the second layer. The second layer of the platen comprises silicone.

In accordance with additional aspects in accordance with the invention, there is provided a protective film for providing protection to an optically transparent platen of an optical fingerprint imaging device, the platen having an exterior surface through which a fingerprint image is to be acquired, the protective film comprising a material that is substantially free from imperfections that would affect transmission of light in acquiring a fingerprint image and which is substantially chemically inert to petroleum-based substances with which it may come into contact when receiving a finger to acquire a fingerprint image, the material of the protective film having a selected hardness thereby adapting the film to resiliently deform to ridges of a fingerprint from a finger pressed onto the film, and an adhesive disposed on an inner surface of the protective film for removably attaching the protective film in optical alignment with the platen, the inner surface facing the platen, the adhesive having a selected cohesive strength such that the protective film may be removed without leaving an adhesive residue thereby allowing repeated replacement of the protective film. In yet a further detailed aspect, the protective film has a greater resistance to abrasion than the platen.

In more detailed aspects, the protective film comprises urethane having a thickness of greater than twenty-five mils. However in another aspect, the protective film comprises a thickness of about three mils to about six mils. The protective film is adapted to deform around and contact finger tip ridges while maintaining a gap between finger tip valleys adjacent the finger tip ridges. The adhesive further comprises a selected wet out characteristic thereby adapting the adhesive to fill in scratches, pits, and other surface irregularities disposed on a surface to which protective film is mounted thereby increasing transmission of light through the surface to which the protective film is mounted. The adhesive has a peel adhesion to the protective film that is greater than a peel adhesion to a surface to which the protective film is mounted. The adhesive comprises an acrylic polymer. The adhesive forms a coating having a thickness of about two mils or less on the protective film.

In accordance with method aspects of the invention, there is provided a method for protecting an optically transparent platen of an optical fingerprint imaging device, the platen having an exterior surface through which a fingerprint image is to be acquired, the method comprising covering the platen with a protective film comprising a material that is substantially free from imperfections that would affect transmission of light in acquiring a fingerprint image and which is substantially chemically inert to petroleum-based substances with which it may come into contact when receiving a finger to acquire a fingerprint image, the protective film having an outer surface and an inner surface, the inner surface facing the platen, removably adhering the protective film to the platen with an adhesive disposed on the inner surface of the protective film for removably attaching the protective film in optical alignment with the platen, and resiliently deforming the protective film to ridges of a fingerprint from a finger pressed onto the protective film.

The features and advantages of the invention will be more readily understood from the following detailed description which should be read in conjunction with the accompanying drawings.

DETAILED DESCRIPTION OF THE PREFERRED EMBODIMENTS

Figure 1:
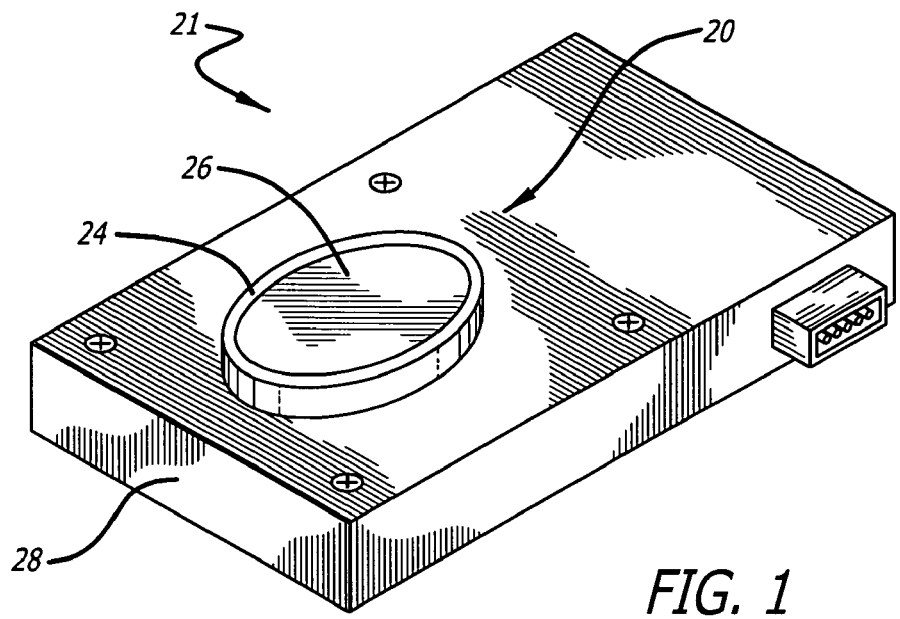
FIG. 1 is a perspective top view of a prior optical fingerprint imaging device showing a housing and an oval-shaped platen onto which a finger tip is pressed to produce a readable fingerprint image.
Figure 2:
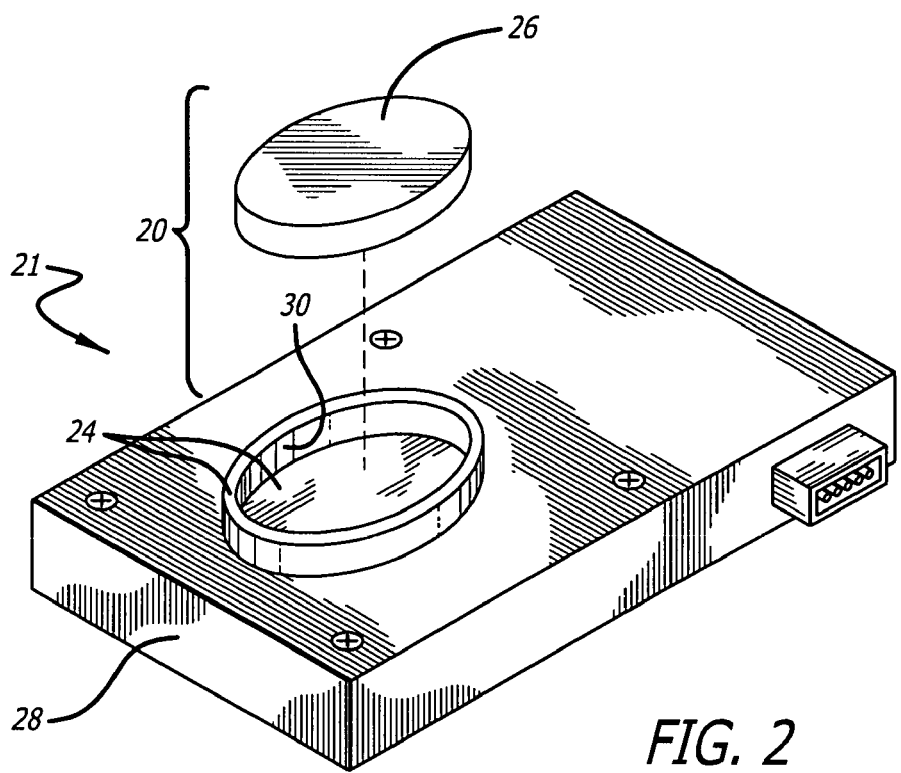
FIG. 2 is a exploded perspective view of the prior optical finger print imaging device of FIG. 1, showing a first layer of the platen detached from a second layer of the platen, the second layer for improving the quality of fingerprint images and forming an external surface for contacting ridges of a finger tip.
Figure 3:
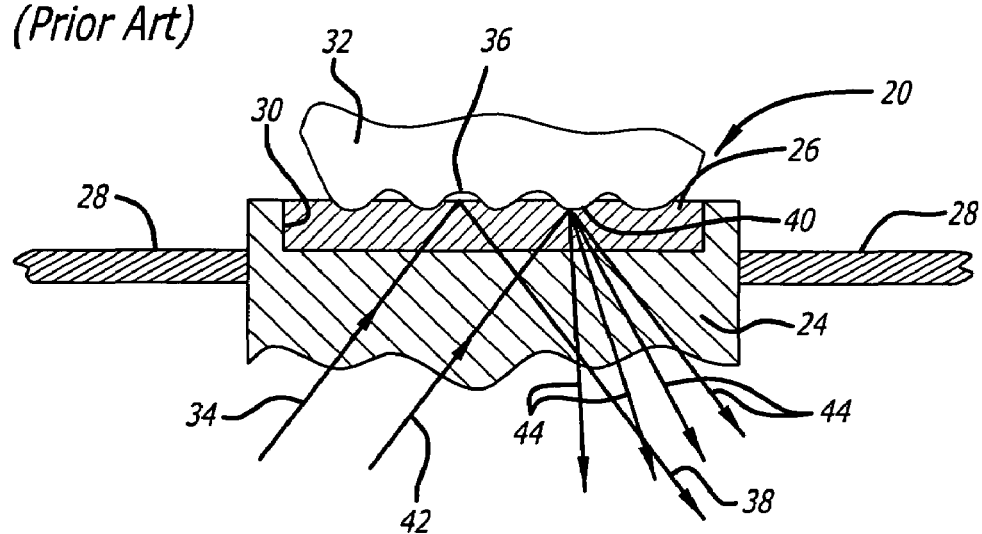
FIG. 3 is a partial cutaway side view through the platen of the prior optical fingerprint imaging device of FIG. 1, showing the platen raised above the housing of the device and a depression in the first layer for receiving the second layer, and further showing deformations on the second layer made by ridges on a finger tip such that reflected light at deformed portions of the second layer are dispersed more than reflected light at relatively flat portions of the second layer.
Figure 4:
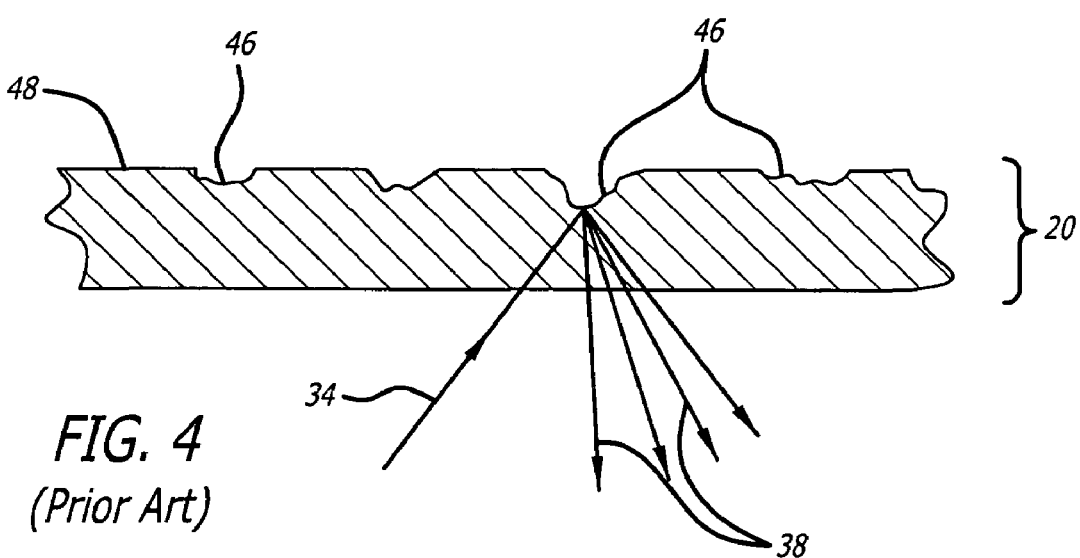
FIG. 4 is detailed view of an exterior surface of a prior platen showing reflected light being dispersed by scratches, pits, and other defects on the exterior surface, which reduces the quality of a fingerprint image.
Figure 5:
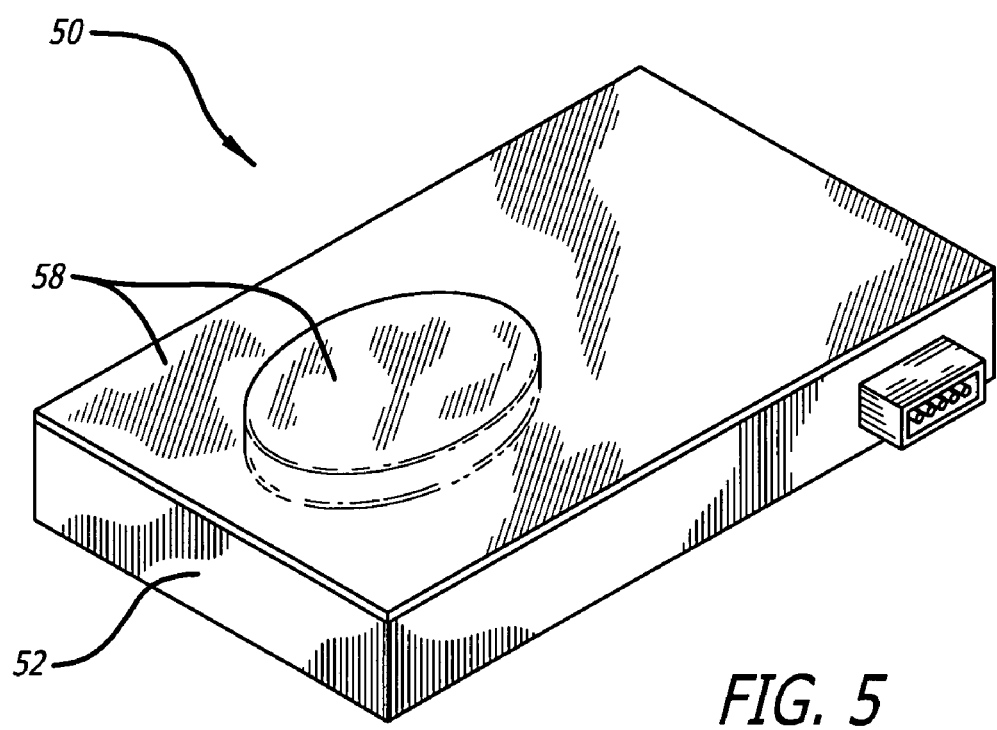
FIG. 5 is a perspective top view of an optical fingerprint imaging device in accordance with aspects of the present invention in which a removable protective film onto which a finger tip is pressed to produce a readable fingerprint image is removably adhered to and conforming over an oval-shaped platen and a portion of a housing of the imaging device.
Figure 6:
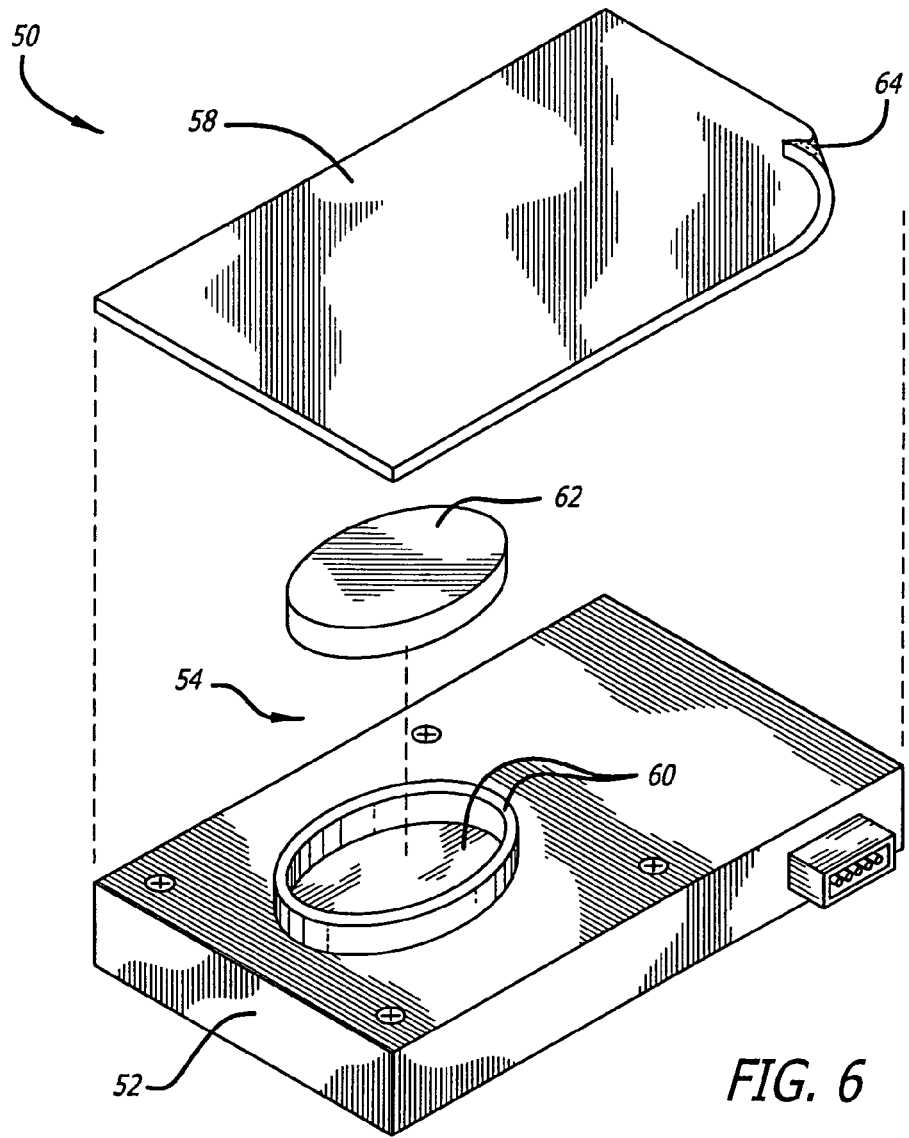
FIG. 6 is an exploded perspective top view of the optical fingerprint imaging device of FIG. 5, showing the housing and the oval-shaped platen onto which a finger tip is optionally pressed to produce a readable fingerprint image, mounting holes on the housing of device, an electrical connector for providing power and communication signals, and the protective film covering the platen and a portion of the housing, and an adhesive on an inner surface of the protective film.

Referring now in more detail to the exemplary drawings, wherein like reference numerals designate corresponding or like elements among the several views, there is shown in FIG. 5 a perspective view of an optical fingerprint imaging device 50 and in FIG. 6 an exploded view of the imaging device. The device includes a housing 52 and a platen 54 disposed thereon. The platen is covered by a removable protective film 58. In this embodiment, the platen includes a first layer 60 and a second layer 62. The protective film 58 is removably attached to the second layer and to the housing. The platen is optically transparent in that it allows light from within the imaging device to readily travel through the platen to accurately produce a fingerprint image of a finger pressed onto the platen for verification or identification purposes.

With particular reference to FIG. 6, the first layer 60 of this embodiment is rigid and preferably, though not necessarily, planar. The first layer can be made of glass, clear plastic, or other optically transparent material. The second layer 62 is softer than the first layer and made of a material that allows it to resiliently deform around ridges of a finger tip pressed onto the platen, thereby increasing fingerprint image quality. When a finger tip is removed from the second layer, the deformations disappear and the second layer returns to its original shape to allow another fingerprint image to be taken. One example of a suitable material for the second layer is a synthetic rubber comprising silicone. It will be appreciated by persons skilled in the art that other suitable materials for the second layer may be used for increasing finger print image quality. Other suitable materials may form a second layer that is not softer than the first layer.

The protective film 58 is designed to be more resistant to damage and degradation than the platen 54. In particular, the protective film is chemically inert or highly resistant, as compared to the platen, to petroleum-based substances, such as may be found in hand lotions or creams on the surface of a finger tip of a healthcare professionals making contact with the platen. Preferably, the protective film is also resistant to degradation caused by ultraviolet radiation and to discoloration over time so as to reduce the frequency of replacement of the protective film. In addition, the protective film is preferably formed of an optical material making it optically transparent. In this embodiment, the protective film has the characteristics of optical glass or optical plastic in that it is formed of optical material so that it will not adversely affect the resolution of an acquired fingerprint image. The protective film is substantially free from imperfections that would affect transmission of light in that minutiae can be accurately read by the imaging device. Such imperfections include, but are not limited to, unmelted particles, foreign particles, bubbles, and chemical inhomogeneities within the protective film and waves, scratches, and pits on a surface of the protective film.

The protective film 58, preferably, also has a greater resistance to abrasion than the platen 54. Abrasion resistance gives the protective film the ability to withstand mechanical action such as rubbing, scraping, or erosion that tends progressively to remove material from its surface. Such ability helps to maintain the original appearance and structure of the protective film exterior surface. Several of techniques to characterize abrasion resistance are published by the American Society for Testing and Materials (ASTM). In ASTM Method D1044-99, "Standard Test Method for Resistance of Transparent Plastics to Surface Abrasion", abrasive damage is judged by that percentage of transmitted light which, in passing through the abraded track, deviates from the incident beam by forward scattering (a smaller percentage indicates greater resistance to abrasion). In ASTM Method D5963-04, "Standard Test Method for Rubber Property—Abrasion Resistance", abrasion resistance is measured by moving a test piece across the surface of an abrasive sheet mounted to a revolving drum, and is expressed as volume loss in cubic millimeters (a smaller volume indicates greater resistance to abrasion) or abrasion resistance index in percent (a larger percentage indicates greater resistance to abrasion).

Generally, materials that are softer and more extensible, but yet resilient, yield a greater resistance to abrasion. As such, the protective film 58 may be made of a material that has a selected hardness that is less than the hardness of the platen 54 such that the film has a greater resistance to abrasion than the platen. It should be noted, however, that excessively soft materials can have a low resistance to abrasion. Also, some materials that yield good abrasion resistance values are prone to chemical breakdown, staining, or attract oil and dirt. For example, a material that is soft and resilient, such as a tacky silicone rubber, may over time exhibit poor abrasion resistance due to chemical breakdown from exposure to petroleum-based substances. Accordingly, the protective film 58 preferably maintains its abrasion resistance, even with exposure to petroleum-based substances, for a longer period of time relative to the platen 54.

Figure 7:
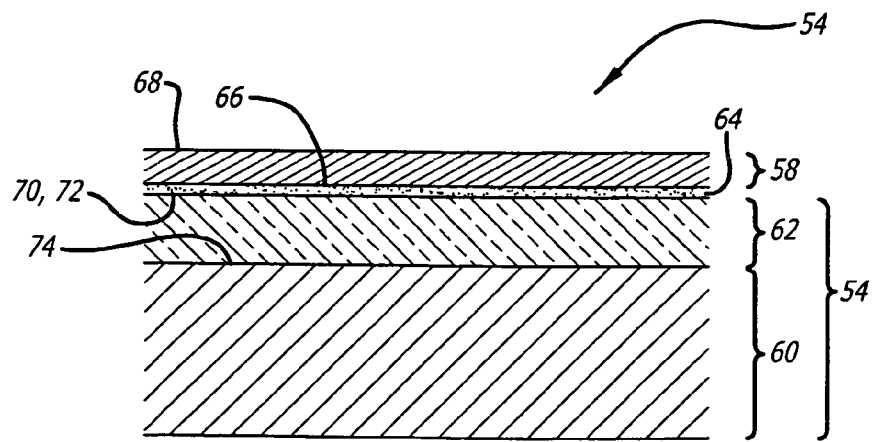
FIG. 7 is a partial cutaway side view through the platen of the optical fingerprint imaging device of FIG. 6, showing first and second layers of the platen, the second layer being softer than the first layer and for improving the quality of fingerprint images, and further showing a protective film removably attached to the second layer by an adhesive disposed between an outer surface of the second layer and an inner surface of the protective film.

As shown in FIG. 7, mounted to the platen 54 is an adhesive 64 that coats an inner surface 66 of the protective film 58. The inner surface faces the platen such that the adhesive bonds to an exterior surface 70 of the platen. The protective film also has an outer surface 68 which makes contact with a finger tip pressed thereon. The protective film outer surface is preferably substantially free of surface irregularities so as not to reduce the quality of an acquired fingerprint image. In the illustrated embodiment, the exterior surface of the platen is formed by an outer surface 72 of the second layer 62. In use, an inner surface 74 of the second layer is in contact with the first layer 60. The first and second layers may be held together by static cling or van der Waals attraction. Alternatively, an adhesive (not shown) between the first and second layers may be used to hold the first and second layers together.

Advantageously, the adhesive 64 is removable. Generally, removable adhesives are characterized by relatively high cohesive strength and low ultimate adhesion compared to other adhesives that are not removable. Further, removable adhesives generally can be removed easily from most surfaces though some adhesive transfer could take place depending on the affinity of the adhesive to the surface. In accordance with the present invention, the affinity or peel adhesion of the adhesive to the protective film 58 is greater than the peel adhesion of the adhesive to the platen 54. Additionally, the adhesive has a selected cohesive strength, or internal strength of an adhesive mass, such that the protective film may be removed from the platen without cohesive failure or splitting the adhesive. As such, the protective film and the adhesive are cleanly removable from the platen in that substantially no adhesive residue is left on the platen when the protective film is peeled off of it. Because substantially no residue is left behind, a soiled or otherwise damaged protective film may be repeatedly removed, discarded, and replaced with a clean and undamaged protective film without having to first clean, and possibly damage, the platen. One example of a suitable adhesive is one made with an acrylic polymer. It is to be understood that the cohesive strength and peel adhesion may vary depending on the material composition and other characteristics of the protective film inner surface 66 and the platen exterior surface 70.

Figure 8:
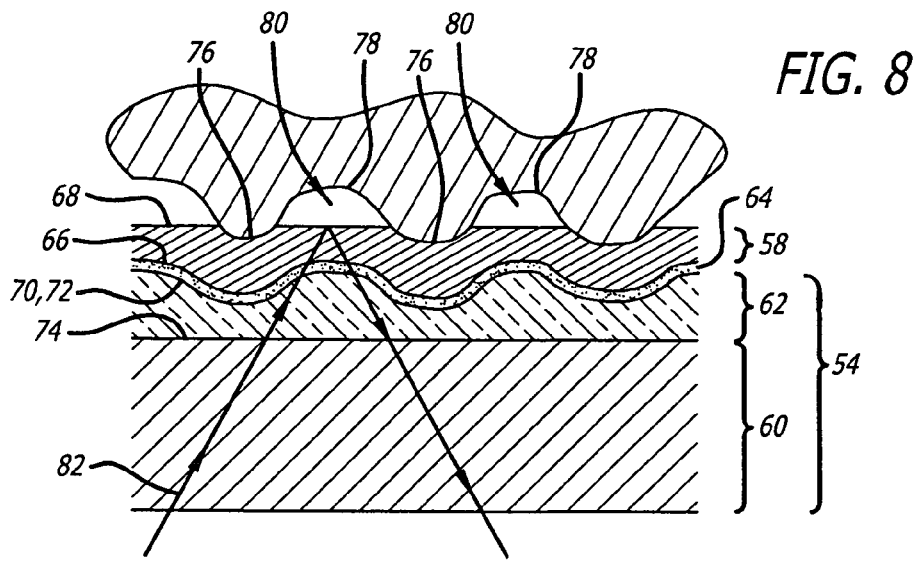
FIG. 8 is a partial cutaway side view through the platen of the optical fingerprint imaging device of FIG. 6, showing a finger tip pressed directly onto the outer surface of the protective film, and showing a ridges of a finger tip deforming a portion of the protective film and second layer.

As shown in FIG. 8, the protective film 58 comprises a material that allows it to resiliently deform around the ridges 76 of a finger tip pressed directly onto a surface of the protective film, thereby increasing fingerprint image quality. An air gap 80 is maintained between the protective film outer surface 68 and finger tip valleys 78 adjacent the finger tip ridges. The finger tip valleys and ridges are exaggerated for clarity of illustration. The difference in refractive index between air and the protective film allows for incident light 82 to be reflected under the finger tip valleys. Preferably, though not necessarily, the protective film has a selected thickness and hardness characteristic, such as for example a Shore or Rockwell value, to allow such deformations to form under typical finger pressure and to disappear to allow the protective film to return to its original shape. With such resiliency, the platen will be ready to provide another fingerprint image soon after a finger tip is removed without there being latent deformations on the protective film. One example of a suitable protective film is a flexible urethane sheet having a thickness of greater than twenty-five mils, and more preferably between about three mils to about six mils.

With continued reference to FIG. 8, the deformations at the outer surface 68 of the protective film 58 are transferred to the inner surface 66 of the protective film and to the exterior surface 70 of the platen 54. In other embodiments (not shown), the deformations at the outer surface 68 of the protective film 58 are not transferred to other surfaces beneath the outer surface 68 of the protective film 58.

Figure 9:
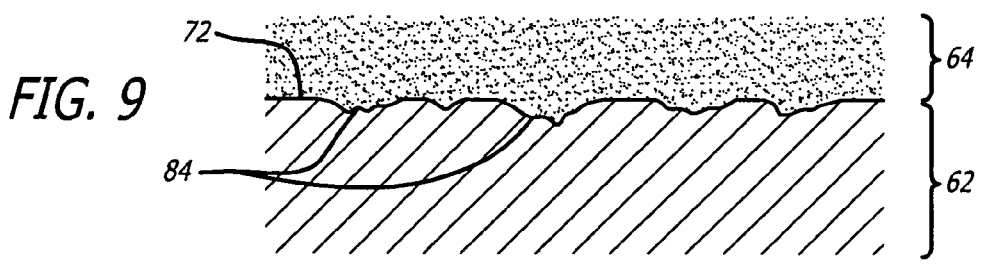
FIG. 9 is a detailed view of an exterior surface of the platen in accordance with the present invention, showing the adhesive filling in scratches, pits, and other defects on the exterior surface.

Referring now to FIG. 9, the adhesive 64 preferably though not necessarily has a selected wet out characteristic, as is known in the art, that allows the adhesive 64 to fill in scratches, pits, and other surface irregularities 84 disposed on the surface to which the protective film 58 is mounted, in this case, the second layer outer surface 72. By filling in the surface irregularities, more light can be reflected at portions of the second layer outer surface under finger tip valleys and be received by an image sensor (now shown) of the imaging device 50. Also, at portions of the second layer outer surface contacting finger tip ridges, more light is absorbed and less light is reflected. As such, a fingerprint imaging device that has become unusable or less reliable because of excessive scratches, pits, or other types of degradation on the exterior surface of the platen can be made usable again or more reliable by adhering the protective film with the adhesive directly to the platen. In this embodiment, the adhesive preferably forms a coating having a thickness of about 2 mils on the protective film. It will be appreciated by those of ordinary skill in the art that other adhesive thicknesses may be used without adversely affecting the quality of an acquired fingerprint image.

The inventor has found that the 3-mil and 6-mil urethane sheeting with the removable acrylic adhesive found in VentureShield™ film from VentureTape Corporation (Rockland, Mass.) exhibits the above protective film and adhesive characteristics. The 6.0-mil sheeting designated as 7510 by VentureTape has a urethane sheet thickness of 0.1524 mm (6.0 mils), an adhesive thickness of 0.0787 mm (2.0 mils), a peel adhesion of 16.3 N/25 mm (25 oz/inch width) as determined in accordance with Pressure Sensitive Tape Council Test Method PSTC-1, a shear adhesion that is indefinite at 15.2 kPa (2.2 psi) as determined in accordance with PSTC-7, a tensile strength of 253 N/25 mm (56 lb/inch width), an elongation at break of 370%, and a puncture resistance of 18 kg as determined in accordance with ASTM D-1000. These numerical specifications are exemplary and are not intended to limit the scope of the invention.

Figure 10:
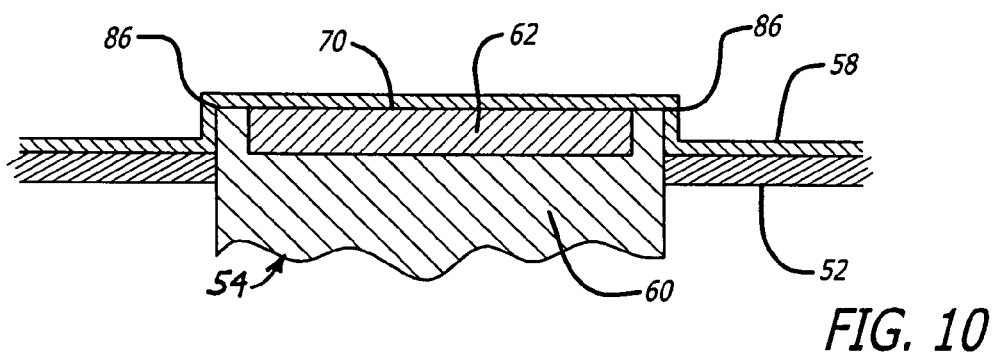
FIG. 10 is a partial cutaway side view through the platen and housing of an optical imaging device of FIG. 5, showing the platen raised above the housing of the device and a depression in the first layer for receiving the second layer, and also showing the protective film adhering to the exterior surface of the platen and a portion of the housing and conforming to corners on the periphery of the platen.

As shown in FIG. 10, the platen 54 exterior surface 70 is raised above the adjacent portions of the imaging device housing 52. As such, in the case when the protective film 58 overlaps and attaches onto adjacent portions of the imaging device housing, the protective film 58 has a selected thickness and flexibility to allow it to conform around the raised corners 86 at the periphery of the platen such that the protective film does no delaminate or detach from the platen exterior surface. Such delamination could introduce air pockets above the platen exterior surface that would adversely affect the quality of an acquired fingerprint image.

Figure 11:
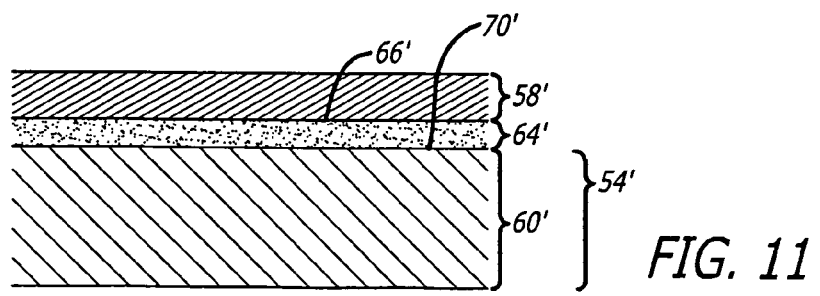
FIG. 11 is a partial cutaway side view through the platen of an optical fingerprint imaging device in accordance with another embodiment of the present invention, showing a platen without a softer second layer, and a protective film removably attached to the platen by an adhesive disposed between an exterior surface of the platen and an inner surface of the protective film.

Referring now to FIG. 11, another embodiment of the present invention includes a platen 54' that comprises a rigid layer 60' without a softer second layer. Mounted to the platen is a protective film 58' and adhesive 64' applied directly to the platen. In this case, the protective film may, though not necessarily, have a thickness of twenty-five mils or greater in order to function in a manner similar to the second layer 62 of the embodiments of FIGS. 5-8. Preferably, the adhesive has a selected wet out characteristic that allows the adhesive to fill in scratches, pits, and other surface irregularities 84 (FIG. 9) disposed on the surface to which the protective film is mounted, in this case, the exterior surface 70' of the platen. In addition, the adhesive 64' on the protective film inner surface 66' has a selected cohesive strength and peel adhesion to allow it to be removable from the exterior surface 70' of the platen. Because the rigid platen of the present embodiment is made of a different material than the soft second layer 62 of the embodiments of FIGS. 5-8, the selected cohesive strength and peel adhesion of the present embodiment may differ, though not necessarily, from the cohesive strength and peel adhesion of the embodiments of FIGS. 5-8.

In use, the protective film with the adhesive is applied to a platen that requires additional protection against scratches and degradation or which has already become scratched or degraded at its exterior surface. The adhesive may, though not necessarily, be transferred to the protective film prior to application onto the platen. Prior to application, the protective film and the adhesive may be stored with a release liner temporarily attached to the adhesive on the protective film. The release liner can be a polycoated bleached kraft paper, or other suitable material to which the adhesive has a low peel adhesion. The release liner would later be peeled away to allow the protective film together with the adhesive to be removably adhered directly to the platen exterior surface. This may be accomplished by pressing the protective film outer surface with a finger and sliding the finger across the protective film to push out any air pockets and to urge the adhesive to fill in any irregularities on the platen exterior surface. To prevent the protective film from inadvertently peeling away from the platen, the protective film may, though not necessarily, be sized to overlap onto and removably attach to portions of the housing surrounding the platen, as shown in FIGS. 5 and 6. The protective film can be peeled away and discarded when it becomes soiled or damage and a new protective film can be applied. In this way, no special tools or training is necessary and no cleaning agents need be used, which might only damage the imaging device. Thus, it will be appreciated that the imaging system, protective film, and method of the present invention allow for quick, simple, and less expensive platen maintenance and reduce the need for future maintenance.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

I claim:

1. An optical fingerprint imaging system for acquiring fingerprint images, the imaging system comprising:
    an optically transparent platen having an exterior surface through which a fingerprint image is to be acquired;
    a protective film comprising urethane that is substantially free from imperfections that would affect transmission of light in acquiring a fingerprint image and which is substantially chemically inert to petroleum-based substances with which it may come into contact when receiving a finger to acquire a fingerprint image, the protective film having an outer surface and an inner surface, the inner surface facing the platen, the film adapted to resiliently deform to ridges of a fingerprint from a finger pressed onto the film; and
    an adhesive disposed on the inner surface of the protective film for removably attaching the protective film in optical alignment with the platen, the adhesive having a selected cohesive strength such that the protective film may be removed without leaving an adhesive residue thereby allowing repeated replacement of the protective film.

2. The imaging system of claim 1 wherein the urethane comprises the characteristics of an optical plastic in that it is free from imperfections which would affect its transmission of light.

3. The imaging system of claim 1 wherein the optically transparent platen comprises a rigid material and the protective film is mounted directly to the exterior surface of the platen.

4. The imaging system of claim 1 wherein the protective film comprises a thickness of greater than twenty-five mils.

5. The imaging system of claim 1 wherein the protective film comprises a thickness of about three mils to about six mils.

6. The imaging system of claim 1 wherein the protective film is adapted to deform around and contact finger tip ridges while maintaining a gap between finger tip valleys adjacent the finger tip ridges.

7. The imaging system of claim 1 wherein the adhesive further comprises a selected wet out characteristic thereby adapting the adhesive to fill in scratches, pits, and other surface irregularities disposed on a surface to which protective film is mounted thereby increasing transmission of light through the surface to which the protective film is mounted.

8. The imaging system of claim 1 wherein the adhesive has a peel adhesion to the protective film that is greater than a peel adhesion to a surface to which the protective film is mounted.

9. The imaging system of claim 1 wherein the adhesive comprises an acrylic polymer.

10. The imaging system of claim 1 wherein the adhesive forms a coating having a thickness of about two mils or less on the protective film.

11. The imaging system of claim 1 wherein:
the platen comprises a first layer of material that is rigid and optically clear and a second layer of material forming the exterior surface of the platen through which light is transmitted to acquire a fingerprint image, the second layer of material adapted to resiliently deform to ridges of a fingerprint from a finger; and
wherein the protective film is mounted to an outer surface of the second layer.

12. The imaging system of claim 11 wherein the second layer of the platen comprises silicone.

13. The imaging system of claim 1 wherein the protective film has a greater resistance to abrasion than the platen.

14. A protective film for providing protection to an optically transparent platen of an optical fingerprint imaging device, the platen having an exterior surface through which a fingerprint image is to be acquired, the protective film comprising:
a urethane that is substantially free from imperfections that would affect transmission of light in acquiring a fingerprint image and which is substantially chemically inert to petroleum—based substances with which it may come into contact when receiving a finger to acquire a fingerprint image, the urethane providing the protective film with a selected hardness thereby adapting the film to resiliently deform to ridges of a fingerprint from a finger pressed onto the film; and
an adhesive disposed on an inner surface of the protective film for removably attaching the protective film in optical alignment with the platen, the inner surface facing the platen, the adhesive having a selected cohesive strength such that the protective film may be removed without leaving an adhesive residue thereby allowing repeated replacement of the protective film.

15. The protective film of claim 14 wherein the protective film comprises a thickness of greater than twenty-five mils.

16. The protective film of claim 14 wherein the protective film comprises a thickness of about three mils to about six mils.

17. The protective film of claim 14 wherein the protective film is adapted to deform around and contact finger tip ridges while maintaining a gap between finger tip valleys adjacent the finger tip ridges.

18. The protective film of claim 14 wherein the adhesive further comprises a selected wet out characteristic thereby adapting the adhesive to fill in scratches, pits, and other surface irregularities disposed on a surface to which protective film is mounted thereby increasing transmission of light through the surface to which the protective film is mounted.

19. The protective film of claim 14 wherein the adhesive has a peel adhesion to the protective film that is greater than a peel adhesion to a surface to which the protective film is mounted.

20. The protective film of claim 14 wherein the adhesive comprises an acrylic polymer.

21. The protective film of claim 14 wherein the adhesive forms a coating having a thickness of about two mils or less on the protective film.

22. The protective film of claim 14 wherein the protective film has a greater resistance to abrasion than the platen.

23. A method for protecting an optically transparent platen of an optical fingerprint imaging device, the platen having an exterior surface through which a fingerprint image is to be acquired, the method comprising: covering the platen with a protective film comprising a urethane that is substantially free from imperfections that would affect transmission of light in acquiring a fingerprint image and which is substantially chemically inert to petroleum-based substances with which it may come into contact when receiving a finger to acquire a fingerprint image, the protective film having an outer surface and an inner surface, the inner surface facing the platen;
removably adhering the protective film to the platen with an adhesive disposed on the inner surface of the protective film for removably attaching the protective film in optical alignment with the platen;
resiliently deforming the protective film to ridges of a fingerprint from a finger pressed onto the protective film; and
removing the protective film from the platen without leaving any significant adhesive residue on the platen.

24. The method of claim 23, wherein the step of covering the platen with a protective film comprising a urethane comprises covering the platen with urethane having the characteristics of an optical plastic in that it is free from imperfections which would affect its transmission of light.

25. The method of claim 23, wherein the step of covering the platen comprises covering a platen that is formed of a rigid material with the protective film mounted directly to the exterior surface of the platen.

26. The method of claim 23, wherein the step of covering the platen with a protective film comprises covering a platen with a protective film having a greater resistance to abrasion than the platen.

27. The method of claim 23, wherein the step of covering the platen with a protective film comprises covering the platen with a protective film having a thickness of about three mils to about six mils.

28. The method of claim 23, wherein the step of covering the platen with a protective film comprises covering a platen with a protective film having a thickness of greater than twenty-five mils.

29. The method of claim 23, wherein the step of adhering with an adhesive comprises adhering with an adhesive having a selected wet out characteristic thereby adapting the adhesive to fill in scratches, pits, and other surface irregularities disposed on a surface to which protective film is mounted thereby increasing transmission of light through the surface to which the protective film is mounted.

30. The method of claim 23 wherein the step of adhering with an adhesive comprises adhering with an adhesive having a peel adhesion to the protective film that is greater than a peel adhesion to a surface to which the protective film is mounted.

31. The method of claim 23 wherein the step of adhering with an adhesive comprises adhering with an adhesive that comprises an acrylic polymer.

32. The method of claim 23 wherein the step of adhering with an adhesive comprises adhering with an adhesive that forms a coating having a thickness of about two mils or less on the protective film.

33. The method of claim 23 wherein:
the step of covering the platen comprises covering a first layer of material and a second layer of material of the platen, first layer being rigid and optically clear, the second layer forming the exterior surface of the platen through which light is transmitted to acquire a fingerprint image, the second layer of material adapted to resiliently deform to ridges of a fingerprint from a finger; and
wherein the protective film is mounted to the exterior surface of the platen to transfer the ridges of a fingerprint from a finger pressed onto the film to the second layer of the platen.

34. The method of claim 33 wherein second layer of the platen comprises silicone.

35. The method of claim 23, wherein the step of covering the platen with a protective film comprises covering a platen with a protective film having a thickness of greater than twenty-five mils.

* * * * *